(12) United States Patent
Pal

(10) Patent No.: US 11,055,767 B2
(45) Date of Patent: Jul. 6, 2021

(54) EFFICIENT TASK COMPLETION VIA INTELLIGENT AGGREGATION AND ANALYSIS OF DATA

(71) Applicant: Microsoft Technology Licensing, LLC, Redmond, WA (US)

(72) Inventor: Manjot Singh Pal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 16/414,249

(22) Filed: May 16, 2019

(65) Prior Publication Data

US 2020/0364773 A1 Nov. 19, 2020

(51) Int. Cl.
  *G06Q 30/06* (2012.01)
  *G06F 3/0482* (2013.01)
  *G06F 3/0484* (2013.01)

(52) U.S. Cl.
  CPC ....... *G06Q 30/0639* (2013.01); *G06F 3/0482* (2013.01); *G06F 3/0484* (2013.01); *G06Q 30/0633* (2013.01)

(58) Field of Classification Search
  CPC ............ G06Q 30/0639; G06Q 30/0633; G06F 3/0482; G06F 3/0484
  USPC ....................................................... 705/26.8
  See application file for complete search history.

(56) References Cited

U.S. PATENT DOCUMENTS

| | | | |
|---|---|---|---|
| 9,595,062 B2 * | 3/2017 | Goulert | H04W 4/021 |
| 2002/0174021 A1 * | 11/2002 | Chu | G06Q 30/0623 705/7.11 |
| 2002/0178088 A1 * | 11/2002 | Lurie | G06Q 20/3276 705/23 |
| 2005/0256786 A1 * | 11/2005 | Sands | G06Q 30/0613 705/28 |
| 2012/0203572 A1 * | 8/2012 | Christensen | G06Q 30/02 705/3 |
| 2013/0066740 A1 * | 3/2013 | Ouimet | G06Q 30/02 705/26.7 |
| 2013/0086161 A1 * | 4/2013 | Avrahami | H04W 4/21 709/204 |

(Continued)

OTHER PUBLICATIONS

Target, There's More in Store With the Target App, Sep. 20, 2017, https://corporate.target.com/article/2017/09/target-app-mike-mcnamara (Year: 2017).*

(Continued)

*Primary Examiner* — Marissa Thein
*Assistant Examiner* — Thomas Joseph Sullivan

(57) ABSTRACT

In non-limiting examples of the present disclosure, systems, methods and devices for assisting with task completion are provided. A plurality of items may be added to an electronic shopping list, wherein the plurality of items is arranged in a first order in the electronic shopping list. A store that each of the plurality of items is available for purchase at may be identified. An indication that a computing device associated with the electronic shopping list is within a threshold distance of an entrance of the store may be received. A location of each of the plurality of items in the store may be identified. The plurality of items may be arranged in a second order in the electronic shopping list based on the location of each of the plurality of items in the store relative to the entrance of the store.

14 Claims, 11 Drawing Sheets

(56) References Cited

U.S. PATENT DOCUMENTS

| | | | | |
|---|---|---|---|---|
| 2014/0067564 | A1* | 3/2014 | Yuan | G06Q 30/0641 705/16 |
| 2014/0108192 | A1 | 4/2014 | Goulart | |
| 2014/0172648 | A1* | 6/2014 | Gross | G06Q 30/0641 705/27.1 |
| 2014/0195374 | A1* | 7/2014 | Bassemir | G06Q 30/0639 705/26.8 |
| 2016/0171432 | A1* | 6/2016 | Pugh | G06Q 30/0635 705/14.23 |
| 2016/0292775 | A1* | 10/2016 | Blass | G06Q 30/0633 |
| 2018/0367483 | A1* | 12/2018 | Rodriguez | H04L 51/046 |
| 2019/0392506 | A1* | 12/2019 | Bogolea | G06Q 30/0633 |

OTHER PUBLICATIONS

HEB, "H-E-B Makes Shopping Even Easier With a New Mobile App", Apr. 22, 2015, heb.com: https://www.heb.com/static-page/article-template/new-mobile-app (Year: 2015).*

Sourav Bhattacharya et al, "An Intelligent Mobile Grocery Assistant", 2012, Eighth International Conference on Intelligent Environments (Year: 2012).*

Tom Ryan, "Walmart and Target go for pinpoint accuracy with in-store search", Nov. 19, 2014, Retail Wire: https://www.retailwire.com/discussion/walmart-and-target-go-for-pinpoint-accuracy-with-in-store-search/ (Year: 2014).*

Daniel Eckert, "Your Shopping Trip Just Got Easier with This New Store Assistant", Feb. 8, 2018, Wal-Mart: https://corporate.walmart.com/newsroom/innovation/20180208/your-shopping-trip-just-got-easier-with-this-new-store-assistant (Year: 2018).*

SawTooth Software, Product Availability (Multi-Store), Feb. 11, 2016, LightHouse Studio: https://sawtoothsoftware.com/help/lighthouse-studio/manual/multistoresettingswindow.html (Year: 2016).*

Satyabrata Pradhan et al, "Wish-list Based shopping Path Discovery and Profitable Path Recommendations", 2012, Third International Conference on Services in Emerging Markets (Year: 2012).*

"International Search Report and Written Opinion Issued in PCT Application No. PCT/US20/028034", dated Jun. 15, 2020, 9 Pages.

* cited by examiner

EFFICIENT TASK COMPLETION VIA INTELLIGENT AGGREGATION AND ANALYSIS OF DATA

BACKGROUND

As computers have become ubiquitous in everyday life, so to has their use in making users' lives more productive. To-do lists are one of the key tools that experts identify as being integral in being productive and accomplishing goals. Users frequently utilize to-do lists for their shopping lists and event planning. However, unless a user is extremely familiar with the stores in the user's area, it is often difficult for the user to efficiently complete a shopping trip. For example, a user may arrange her shopping list based only on a time that the user thought to include a new item on the list, rather than ordering it in the most efficient manner for completing the shopping in one or more stores that carry the items included on the list.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with the efficient completion of tasks. Shopping task lists maintained by a task completion application may be utilized to identify stores that carry the items included in those lists, as well as the location of the items in stores. Various criteria and/or rules may be utilized for determining when the task completion application should attempt to identify whether stores carry the items included in the list (e.g., proximity to user device, proximity to user's typical travel path, etc.). The task completion application may surface store suggestions for purchasing items on a list based on various criteria, such as: proximity to user, estimated duration of travel time to location, cost of item at location, cost of item at location relative to other stores, etc. In some examples, the items in the shopping task list may be reordered in a list when a user arrives at a store. The items may be rearranged in the list to make the user's shopping experience more efficient. For example, the items may be rearranged such that the items that are closest to the user in the store are pushed to the top of the list and/or made more prominent in the list (e.g., bolded, highlighted), while the items that are further away from the user are pushed to the bottom of the list and/or made less prominent in the list. In some examples, the task completion application may provide an indication in the list of the location of an item in a store.

Additional examples of the present disclosure describe systems, methods and devices for assisting with the efficient completion of tasks in relation to events. An event and a shopping list associated with an event may be identified by a task completion application. Invitees and user accounts associated with those invitees may also be identified. According to examples, the items in the shopping list for the event may be assigned as tasks to the invitees based on various criteria and attributes of the invitees (e.g., experience/history of shopping for items of a certain type, history of being assigned shopping tasks, proximity to item, etc.). When modifications to the event/invite are detected, the task list may be updated automatically and those updates may be pushed to the invitee users that the assignment of tasks have been delegated to.

BRIEF DESCRIPTION OF THE DRAWINGS

Non-limiting and non-exhaustive examples are described with reference to the following figures.

DETAILED DESCRIPTION

Figure 1:
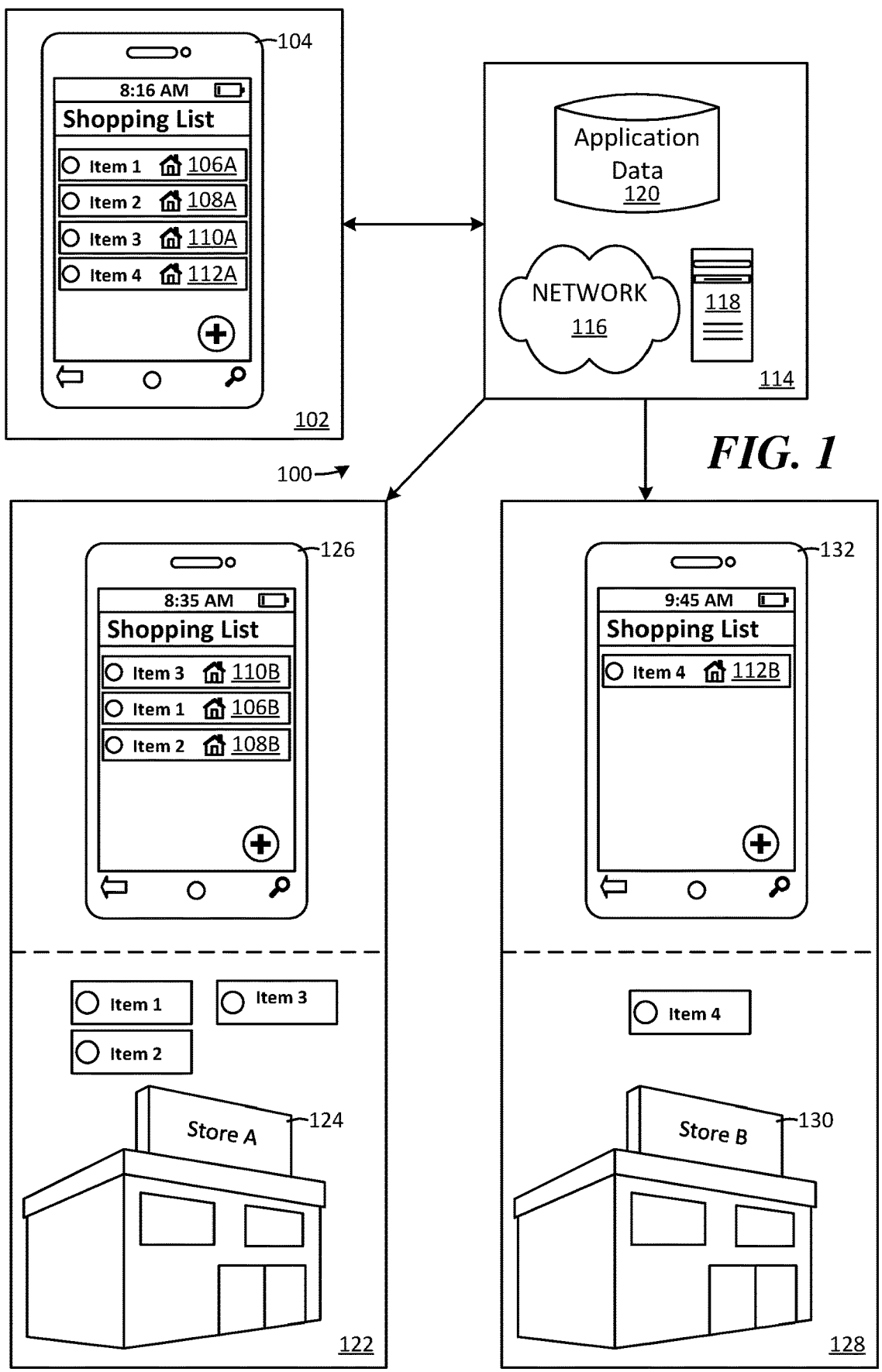
FIG. 1 is a schematic diagram illustrating an example distributed computing environment for assisting with the efficient completion of a task shopping list.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with task completion in relation to shopping lists and allocation of tasks to users. A shopping list may be added to a task completion application, a notes application, etc. The shopping list may include a plurality of items that a user would like to purchase (subtasks). In examples, the task completion application may surface notifications and/or prompts on a computing device executing the task completion application when the computing device is within a threshold proximity of a store that has one or more of the items for purchase. In some examples, there may be one or more rules associated with the task completion application that are utilized by the task completion application to determine whether a store is in the vicinity of a user (e.g., the user's computing device and its received GPS coordinates) that carries one of the items. For example, a user associated with the task completion application may make a rule that only stores within a threshold distance of the user/device be surfaced, that only stores that the user has electronic coupons for be surfaced, that only stores that the user has a rewards account with be surfaced. In some examples, a rule may specify that if a user account is linked to one or more credit cards that have varying rewards that are issued based on shopping at different stores, the task completion application may prioritize stores that maximize the rewards (e.g., maximize based on the reward being linked to an item type on the user's shopping list, maximize based on the reward being linked to a minimum spend, etc.).

The task completion application may maintain a locational store database that stores can upload a list of their items/inventory to and/or a location of those items within the store (e.g., aisle number, area in a store grid, shelf number, shelf level, etc.). In other examples the stores themselves may maintain the inventory and location information for items in their own databases and the task completion application may be granted with access to that store information. In such examples, the task completion application may, when one of the above criteria/rules is satisfied (e.g., a user/device with a shopping task list is within a requisite threshold proximity of a store), determine whether the store carries the item, determine the location of the item, and/or determine a price for the item. In some examples, more than one store that offers the item may be identified by the task completion application. In such examples, all of the stores meeting specified criteria may be surfaced/recommended (e.g., all stores within a specific range, all stores on a user's regular driving route, etc.). In other examples, a subset of the stores may be surfaced/recommended.

According to examples, when the user and the device executing the task completion application are within a minimum threshold range of a store, the task completion application may automatically reorder the items in the shopping list that are available for purchase at the store. That is, the items in the shopping list may be reordered according to their location in the store relative to a determined location of the user (i.e., the user's computing device), and/or a determined location of the user relative to one or more entrances of the store and/or the location of the items in the store.

According to additional examples, an event (e.g., a birthday party, a work event, etc.) may be added to a task completion list. The event may be manually entered in the task completion list by an event creator. In other examples, the event may be added to the task completion list based on the event being identified in an electronic message that the task completion application has access to (e.g., an electronic email invite, a text message invite, etc.). The task completion application may identify the event via application of one or more natural language processing and/or machine learning models to the message. In some examples, the task completion application may identify invitees of the event and/or user accounts associated with those invitees (e.g., user accounts for the task completion application, user accounts associated with the email of the invitees, etc.). In some examples, a user database may be maintained by the task completion application, and that database may include information associated with the aforementioned user accounts, such as: whether users have expertise shopping for certain items/item types based on their internet search history, and/or whether the users have a pattern of being assigned to help with the purchase of items of a certain type for events in the past. In additional examples, the task completion application may have access to those invitees' device locations. As such, the task completion application may automatically assign item pickup/purchase tasks to specific invitees based on rules associated with the invitees' proximity to an item, expertise with a shopping category, and/or item purchasing assignment pattern history, for example.

The systems, methods, and devices described herein provide technical advantages for completing shopping task lists. Processing costs (i.e., CPU cycles) associated with searching for stores in a convenient location, performing additional searches to determine whether an item is available for purchase at those stores, and/or performing comparison online shopping are reduced by automating the process according to the mechanisms described herein and allowing users to apply one or more rules that dictate which stores will be searched and recommended. Efficiency and user experience are also improved upon by the examples described herein. For example, rather than having a user attempt to execute a shopping list based on the user's knowledge, or lack thereof, of a store's layout, the mechanisms described herein allow a user to quickly identify the closest items to the user, and home in on those items' specific location in a store. The mechanisms described herein also reduce the need for a user to travel around and/or call stores to locate specific items on a shopping list. Further, by automating task assignment (e.g., assignment of the purchasing of items for an event), the mechanisms described herein greatly reduce the number of messages that are necessary to coordinate the group planning and execution of an event.

FIG. 1 is a schematic diagram illustrating an example distributed computing environment 100 for assisting with the efficient completion of a task shopping list. Distributed computing environment 100 includes new task list sub-environment 102, network and processing sub-environment 114, first location task completion sub-environment 122, and second location task completion sub-environment 128. Network and processing sub-environment 114 includes network 116, server computing device 118, and application database 120. A cloud-based task completion service may operate on one or more computing devices in network and processing sub-environment 114, such as server computing device 118. The task completion service and/or a task completion application associated with the task completion service may store various information associated with a task completion application and/or its users (if explicitly authorized by those users) in application database 120.

New task list sub-environment 102 includes computing device 104 (e.g., a smart phone, a tablet, etc.), which displays a user interface for a task completion application. The task completion application may be executed entirely on computing device 104, entirely in the cloud (e.g., by a cloud-based task completion service), and/or partially on computing device 104 and partially in the cloud. In this example, the task completion application has received a shopping task ("Shopping List") and displays that shopping task with a plurality of subtasks (i.e., individual items that are to be purchased). Specifically, the shopping task includes the following subtasks (items): Item 1 106A, Item 2 108A, Item 3 110A, and Item 4 112A.

According to examples, the task completion application and/or the task completion service may make completing a shopping task more efficient, economical and/or user-friendly by one or more of: identifying stores that items are available for purchase at; recommending that items be purchased at stores that users can get to quickly; and/or recommending that items be purchased at stores that users have coupons, discounts and/or awards for. In additional examples, when a user arrives at a store (e.g., is within a threshold distance of a store and/or threshold distance of an entrance of a store), the task completion application and/or task completion service may arrange the items in a shopping list such that the user can most efficiently collect and purchase the items.

In this example, the task completion application and/or service has recommended (e.g., surfaced in the task completion application, provided directions in a map application, etc.) that a user purchase item 1 106A, item 2 108A and item 3 110A at Store A 124, as illustrated in first location task completion sub-environment 122. According to examples, when a determination is made that the user's device (computing device 126, which may be the same or a different computing device as computing device 104) is within a threshold distance of Store A 124, and/or an entrance of Store A 124, the task completion application and/or service may cause the items that it recommended to be purchased at Store A 124 to be re-arranged in the shopping list such that they can be collected and purchased in an efficient manner. In some examples, the rearrangement may be based on the device's location relative to each of the other items on the list in the store. In other examples, the rearrangement may be based on the device's location relative to one or more entrances of the store and the items in the store. Thus, in this example, computing device 126 displays rearranged items in the list, such that item 3 108 is listed first, item 1 106B is listed second, and item 2 108B is listed third. That is, computing device 126 and/or an entrance of Store A 124 that computing device 126 is determined to be closest to, may be closest to the location of item 3 1108, followed by item 1 106B and item 2 108B, respectively. As such, the user can utilize the arrangement of the shopping list in the task completion application to quickly complete the shopping task.

In examples, the user may select one or more of the displayed tasks (e.g., Item 3 110B, Item 1 106B, Item 2 108B) to view locational information identified for those corresponding items. For example, by selecting Item 3 110B on the display of computing device 126 when computing device 126 is within a threshold distance of Store A 124, the task completion application and/or service may cause a location of Item 3 110B in Store A 124 to be displayed on computing device 126. The surfaced location may be, for example, an aisle number, a shelf number, a coordinate on a map, etc.

As further included in this example, the task completion application and/or service has recommended (e.g., surfaced in the task completion application, provided directions in a map application, etc.) that a user purchase item 4 112A at Store B 130, as illustrated in second location task completion sub-environment 128. According to examples, when a determination is made that the user's device (computing device 132, which may be the same or a different computing device as computing device 126 and/or computing device 104) is within a threshold distance of Store B 130, and/or an entrance of Store B 130, the task completion application and/or service may cause the item that it recommended to be purchased at Store B 130 to be surfaced in the task completion application. The user may select that task to view locational information identified for that item. For example, by selecting Item 4 112B on the display of computing device 132, the task completion application and/or service may cause a location of Item 4 112B in Store B 130 to be displayed on computing device 132. The surfaced location may be, for example, an aisle number, a shelf number, a coordinate on an electronic map in a map application, etc.

Figure 2:
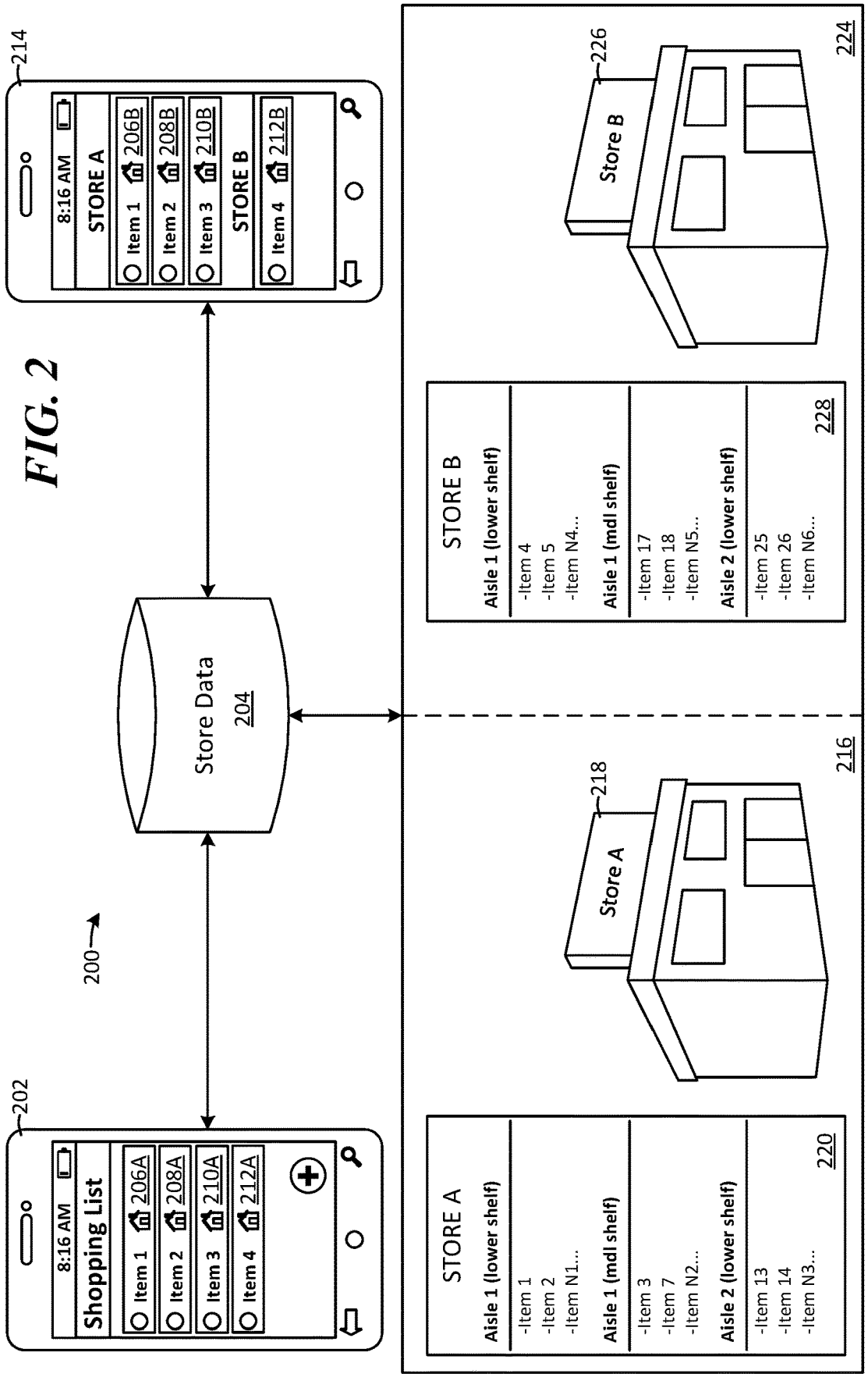
FIG. 2 is a schematic diagram illustrating an example distributed computing environment including exemplary details of the utilization of a store item locational database in association with a task completion service.

FIG. 2 is a schematic diagram illustrating an example distributed computing environment 200 including exemplary details of the utilization of a store item locational database 204 in association with a task completion service. Distributed computing environment 200 includes store item locational database 204, Store A sub-environment 216, Store B sub-environment 224, and computing devices 202 and 214, which may be the same or different computing devices.

Locational database 204 may include information from one or more stores regarding the items that are available for purchase at those one or more stores and the location of those items within the one or more stores. This information may be stored in various formats (e.g., tables, lists, document types, etc.). In some examples, locational database 204 may be maintained by the task completion service and stores may provide their item and location information directly to the task completion service for compiling and storing in locational database 204. In other examples, stores may maintain their own independent databases that contain item and location information, and the task completion application and/or service may be provided with access to those independent databases (e.g., the task completion service may send an API call to a store item and location database to determine what items are available and what location the items reside at for a given store location).

In this example, Store A 218 has a list 220 corresponding to the items it has available for purchase at Store A. List 220 also includes an approximate location for each of those items (aisle and shelf level). For illustrative purposes it can be assumed that list 220 is stored electronically in locational database 204 in association with the task completion application. However, as described above, list 220 may additionally or alternatively be stored in a location apart from the task completion service (e.g., in a distinct Store A database).

Store B 226 has a list 228 corresponding to the items it has available for purchase at Store B. List 228 also includes an approximate location for each of those items (aisle and shelf level). For illustrative purposes it can be assumed that list 228 is stored electronically in locational database 204 in association with the task completion application. However, as with list 220, list 228 may additionally or alternatively be stored in a location apart from the completion service (e.g., in a distinct Store B database).

Computing device 202 displays a shopping task ("Shopping List") in the task completion application, with four subtasks (Item 1 206A, Item 2 208A, Item 3 210A and Item 4 212A). In some examples, the task completion application and/or service may automatically attempt to identify stores that carry items in a shopping list by analyzing locational database 204 for stores that are within a threshold distance of computing device 202, for stores that a computing device 202 and/or an account associated with computing device 202 has a coupon or reward for, for stores that have been determined to be frequented most often by a user of computing device 202, etc. In other examples, the task completion application and/or service may only attempt to identify stores that carry items in a shopping list when manually requested to perform that action. In some examples, the store lists that the task application and/or service queries for items may be determined based on a user setting (e.g., the user may specify that the closest stores to the user/device are queried, the user may specify that the stores that the user has a rewards account are queried, the user may specify that if more than one store is determined to carry an item then the store with the cheapest price be utilized for future actions in completing a purchase of that item, etc.).

In this example, the task completion application and/or service identifies, based on analysis of list 220, that Store A 218 carries Item 1 206A, Item 2 208A and Item 3 210A from the shopping list, but not Item 4 212A. The task completion application and/or service identifies, based on analysis of list 228, that Store B 226 carries Item 4 212A. As such, to aid a user in completing the shopping task, the task completion application displays each of the items in the shopping task (items 1-4) in association with the store where they can be purchased. Specifically, Item 1 206B, Item 2 208B and Item 3 210B are displayed below "Store A" on computing device 214, and Item 4 212B is displayed below "Store B" on computing device 214. In some examples, the stores where the items may be purchased may be displayed based on a proximity to computing device 214 and/or a calculated duration of time that it will take the user associated with computing device 214 to travel to those stores. Other ordering mechanisms are also contemplated (e.g., closing time of stores, stores with items that are identified as being a priority ordered first, etc.).

Figure 3A:
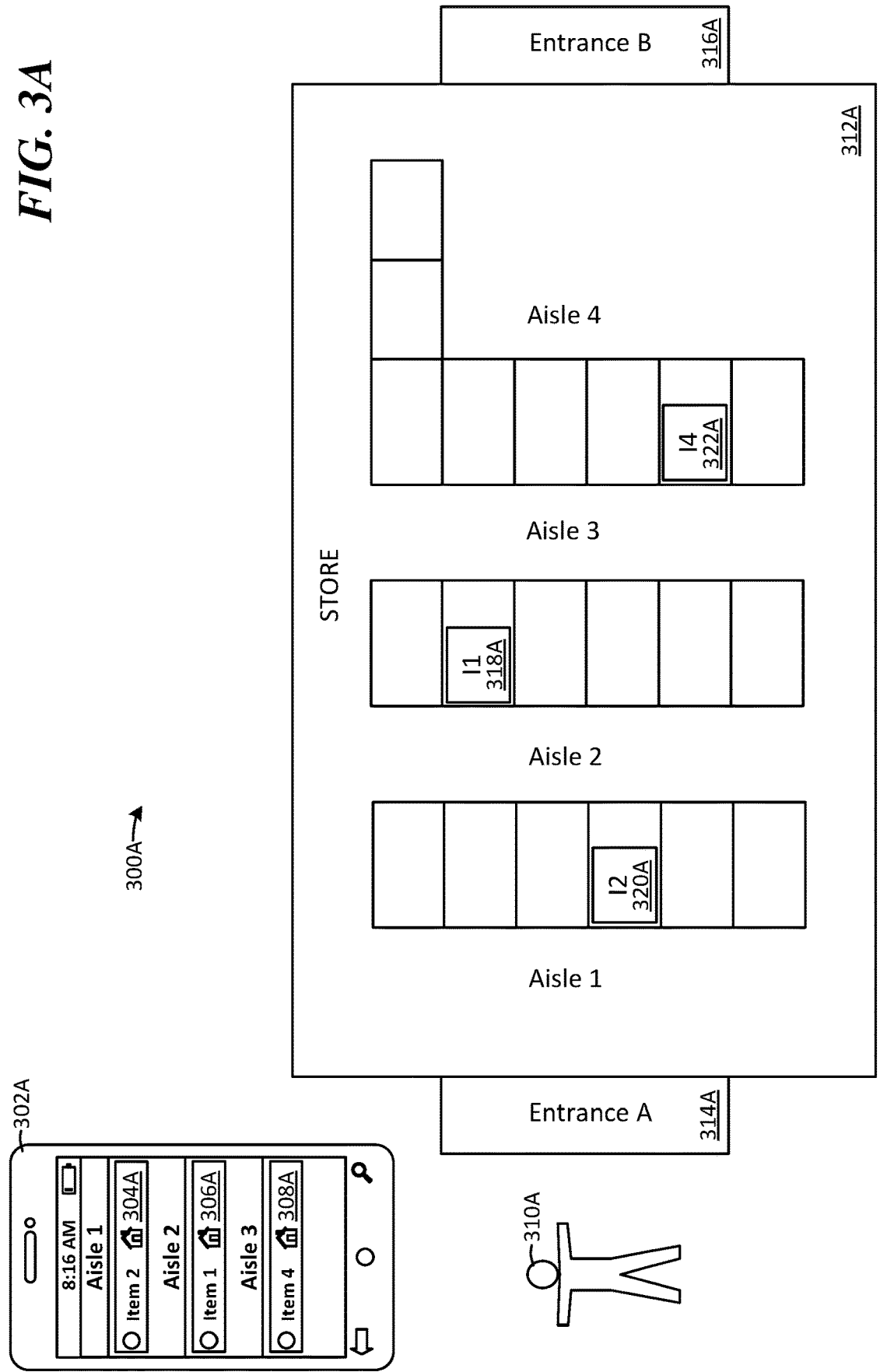
FIG. 3A is a schematic diagram illustrating the dynamic reorganization of a shopping list in a task completion application based on a user's location relative to a store's entrances.

FIG. 3A is a schematic diagram 300A illustrating the dynamic reorganization of a shopping list in a task completion application based on a user's location relative to a store's entrances. Diagram 300A includes user 310A, computing device 302A and store 312A. In this example, user 310A has logged into the task completion application on computing device 302A and is attempting to complete a shopping task. The task completion application and/or service has identified that store 312A has items on the user's shopping task list (Item 2 304A, Item 1 306A and Item 4 308A). As such, when user 310A (and corresponding computing device 302A) is determined to be within a threshold distance of store 312A and/or one of store 312A's entrances (i.e., Entrance A 314A, Entrance B 316A), the task completion application surfaces the items that are available at store 312A in an order corresponding to the user's location relative to the items and/or the location of the items in the store relative to the entrance that the user is determined to be closest to.

In this example, computing device 302A, and thus user 310A, is determined to be closer to Entrance A 314A than Entrance B 316A. As the map of store 312A illustrates, the item 2 location 320A is in aisle 1 of the store (closest to Entrance A 314A), the item 1 location 318A is in aisle 2 of the store (between Entrance A 314A and Entrance B 316A), and the item 4 location 322 is in aisle 3 (closest to Entrance B 316A). As such, the items (items 1, 2 and 4) are displayed in the task completion application on computing device 302A in an order corresponding to their locational proximity to user 310A and/or the entrance that user 310A is determined to be closest to. That is, Item 2 304A is displayed above Item 1 306A, which is displayed above Item 4 308A. Additionally, each of the items (items 1, 2 and 4) are displayed in the task completion application with an indication of the location in store 312A that they can be obtained at. As described with reference to FIG. 2, the location information for each item may be obtained from a locational database, such as locational database 204.

Figure 3B:
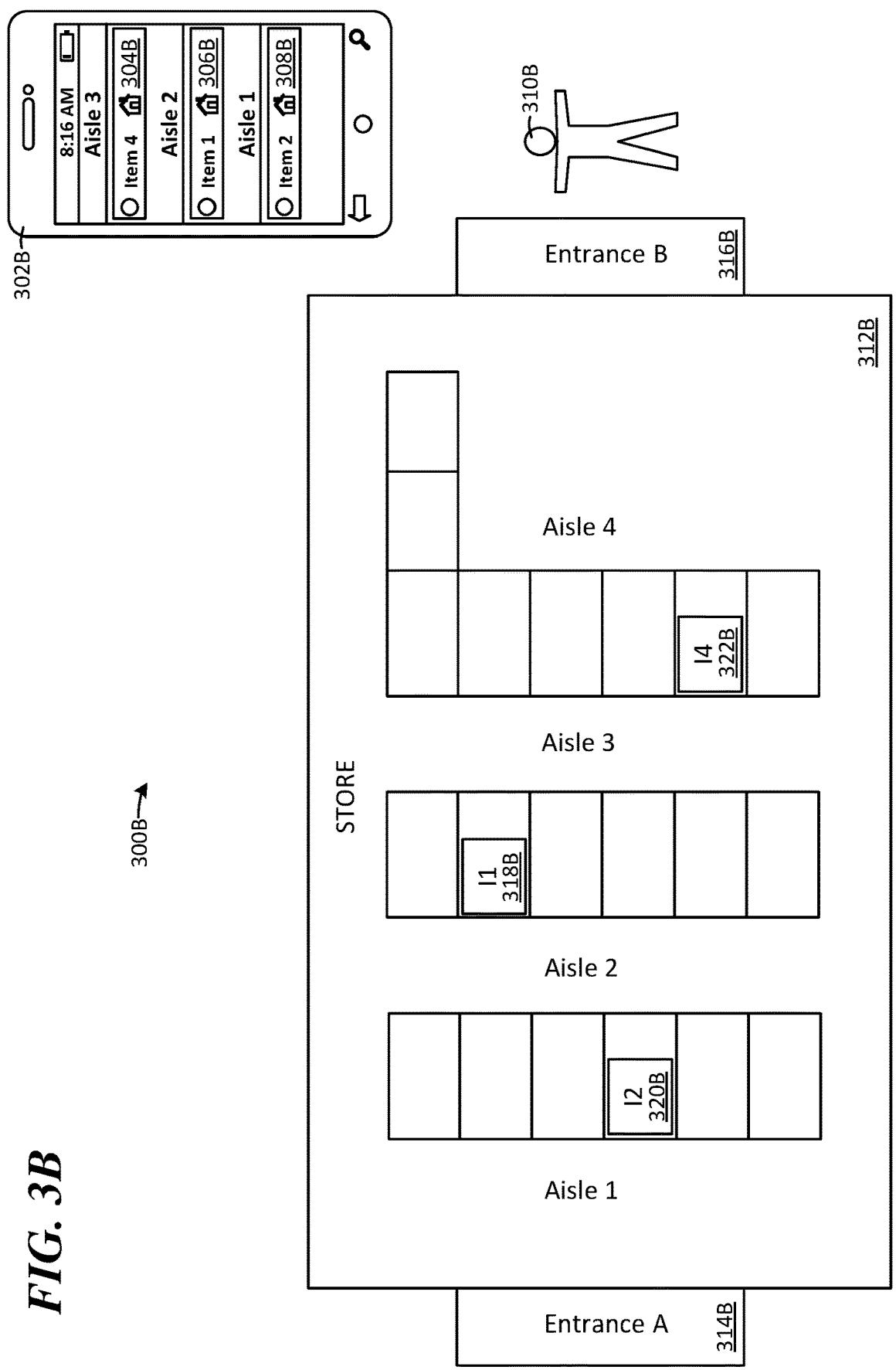
FIG. 3B is another schematic diagram illustrating the dynamic reorganization of a shopping list in a task completion application based on a user's location relative to a store's entrances.

FIG. 3B is another schematic diagram 300B illustrating the dynamic reorganization of a shopping list in a task completion application based on a user's location relative to a store's entrances. Diagram 300B includes user 310B, computing device 302B and store 312B. In this example, user 310B has logged into the task completion application on computing device 302B and is attempting to complete a shopping task. The task completion application and/or service has identified that store 312B has items on the user's shopping tsk list (Item 4 304B, Item 1 306B and Item 2 308B). As such, when user 310B (and corresponding computing device 302B) is determined to be within a threshold distance of store 312B and/or one of store 312B's entrances (i.e., Entrance A 314B, Entrance B 316B), the task completion application surfaces the items that are available at store 312B in an order corresponding to the user's location relative to the items and/or the location of the items in the store relative to the entrance that the user is determined to be closest to.

In this example, computing device 302B, and thus user 310B, is determined to be closer to Entrance B 316B than Entrance A 314B. As the map of store 312B illustrates, the item 4 location 322B is in aisle 3 of the store (closest to Entrance B 316B), the item 1 location 318B is in aisle 2 of the store (between Entrance B316B and Entrance A 314B), and the item 2 location 320B is in aisle 1 (closest to Entrance A 314B). As such, the items (items 1, 2 and 4) are displayed in the task completion application on computing device 302B in an order corresponding to their locational proximity to user 310B and/or the entrance that user 310B is determined to be closest to. That is, Item 4 304B is displayed above Item 1 306 B, which is displayed above Item 2 308B. Additionally, each of the items (items 1, 2 and 4) are displayed in the task completion application with an indication of the location in store 312B that they can be obtained at. As described with reference to FIG. 2, the location information for each item may be obtained from a locational database, such as locational database 204.

Figure 4:
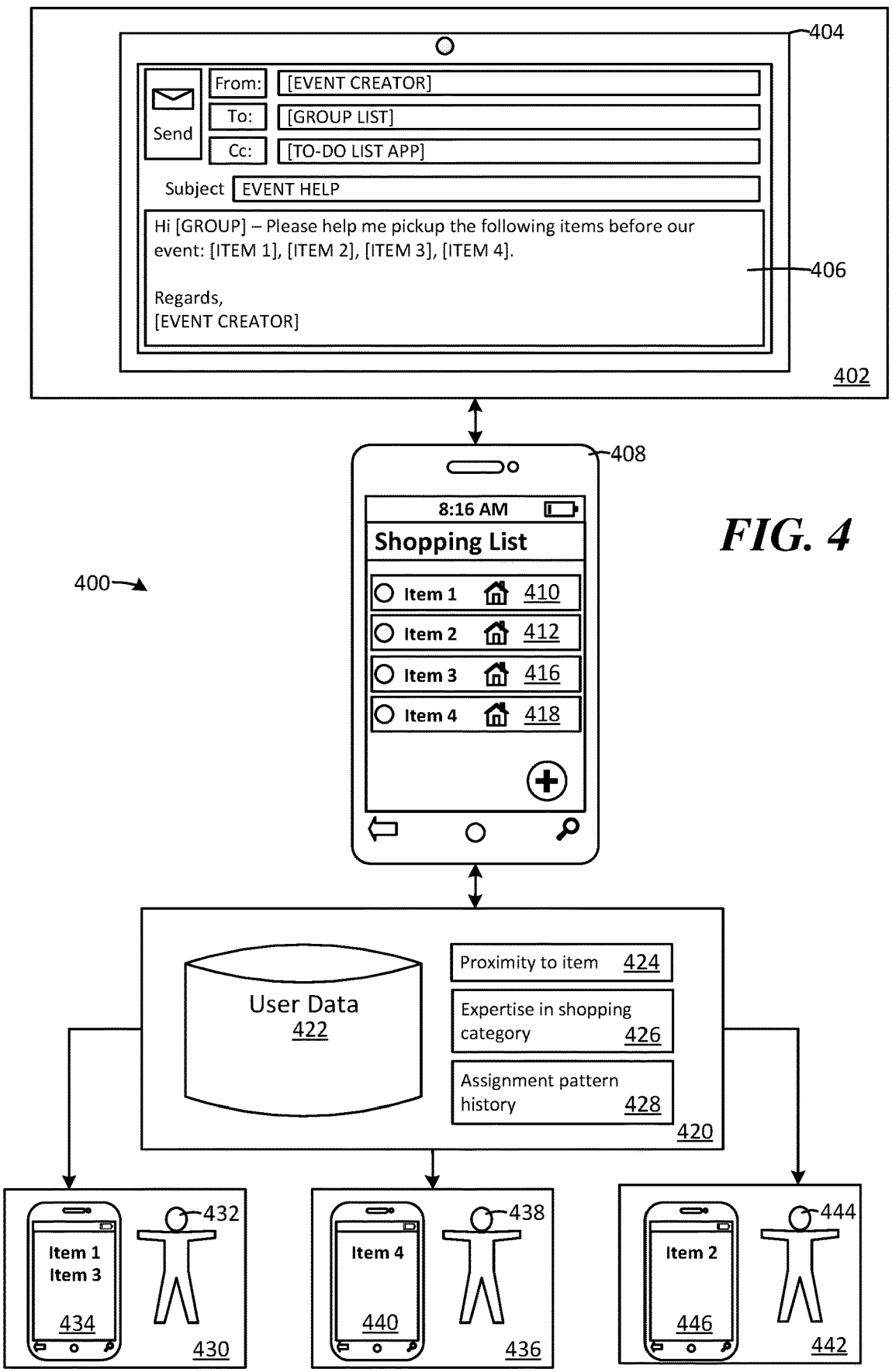
FIG. 4 is a schematic diagram illustrating an example distributed computing environment for the intelligent extraction of event tasks from a natural language input, and the assignment of those event tasks to a plurality of users based on various attributes.

FIG. 4 is a schematic diagram illustrating an example distributed computing environment 400 for the intelligent extraction of event tasks from a natural language input, and the assignment of those event tasks to a plurality of users based on various attributes. Computing environment 400 includes event creation sub-environment 402, computing device 408, task assignment sub-environment 420, and user assignments 430, 436 and 442.

Event creation sub-environment 402 includes computing device 404 and email 406, which is exemplary of any natural language input to the task completion application and/or service that may be extracted and processed for identifying an event associated with that input, tasks associated with that event, subtasks associated with tasks, invitees associated with that event, and/or user accounts associated with the invitees of that event. In this example, a user has utilized computing device 404 to draft email 406, which includes [EVENT CREATOR] in the "From" field, [GROUP LIST] in the "To" field, [TO-DO LIST APP] in the "Cc" field, and "EVENT HELP" in the "Subject" field. The body of email 406 states: "Hi [Group]—Please help me pickup the following items before our event: [Item 1], [Item 2], [Item 3], [Item 4]. Regards, [EVENT CREATOR]. In some examples the task completion application may automatically receive email 406 based on it being included in the "Cc" field (i.e., [TO-DO LIST APP]).

According to examples, email 406 (which is representative of any natural language input from an application, service, and/or location that the task completion application and/or service has been granted access to) may have one or more natural language processing and/or machine learning models applied to it by the task completion application and/or service. The natural language processing and/or machine learning models may process the body of the email 406 and/or content in one or more of the fields associated with email 406 and make a determination as to whether email 406 includes a primary task/event. If email 406 is determined to include a primary task/event, an additional determination may be made (via application of one or more natural language processing and/or machine learning models) as to whether email 406 also includes one or more subtasks and/or invitees.

Based on processing of email 406, the task completion application and/or service has identified that there is a primary task/event included in email 406, that the event includes four subtasks (purchase [item 1], purchase [item 2], purchase [item 3], and purchase [item 4]). Once identified, those subtasks are associated with a main task that has been added to the task continuation application/service for the [EVENT CREATOR] that sent email 406. The association of those tasks with the main task is illustrated on computing device 408, which displays the primary task "Shopping List", with the identified subtasks displayed beneath it (i.e., Item 1 410, Item 2 412, Item 3 416 and Item 4 418). Although the identified primary task and subtasks are displayed on computing device 408, in some examples the identified event, primary task, and/or subtasks, may be associated with a list that is not displayed on any device, but rather that is simply saved in association with one or more task continuation application/service user accounts (e.g., user account for the [EVENT CREATOR], user account for the event invitees).

Additionally, based on processing of email 406, the task completion application and/or service has identified that there are three invitees associated with user accounts that are included in email 406 (i.e., user 432, user 438 and user 444). In some examples, the task completion application and/or service may match user names, email alias, etc., included in email 406 (e.g., user names/email addresses included in [GROUP LIST]) to accounts in user data store 422 as illustrated in task assignment sub-environment 420. User data store 422 may include information (e.g., user names, email addresses, web browsing history associated with accounts, etc.) of users of the task continuation application/service and/or information associated with users of applications that the task continuation application/service has been granted with access to.

In this example, the user accounts associated with the identified users/invitees included in email 406 have been matched to user accounts, and information corresponding to those user accounts has been analyzed. Specifically, information corresponding to one or more of: user location, expertise in shopping categories, past task assignments, has been analyzed for each of users 430, 436 and 442. The subtasks, may thus be assigned to the users based on attributes of the users as defined by that information. In some examples, the assignment of subtasks to users may be defined by rules of the task completion application and/or service. In this example, three rule types are illustrated—proximity to item rule 424, expertise in shopping category 426, and assignment pattern history 428. Those rules may be created and/or modifiable by a user associated with the task completion application (e.g., by the event creator in the illustrated example). As an example, the event creator may create a rule that specifies that subtasks corresponding to purchasing items of a certain type (e.g., party decorations, gifts) be assigned to users that the event creator has assigned those types of tasks to in the past. In another example, the event creator may create a rule that subtasks corresponding to purchasing items of another type (e.g., dinner food, lunch food) be assigned to any user that is currently near a store that offers those items for purchase. In another example, the event creator may create a rule that subtasks corresponding to purchasing items of another type (e.g., alcoholic beverages, mixers) be assigned only to users that have a specific expertise for shopping for items of those types as determined based on the users' web browsing history.

Thus, in this example, the subtasks corresponding to the purchase of Item 1 410 and Item 3 416 are assigned to user 432 based on one of the rule types (e.g., proximity to item rule 424, expertise in shopping category 426, assignment pattern history rule 428). The subtask corresponding to the purchase of Item 4 418 is assigned to user 438 based on one of the rule types, and the subtask corresponding to Item 2 412 is assigned to user 444 based on one of the rule types.

Figure 5A:
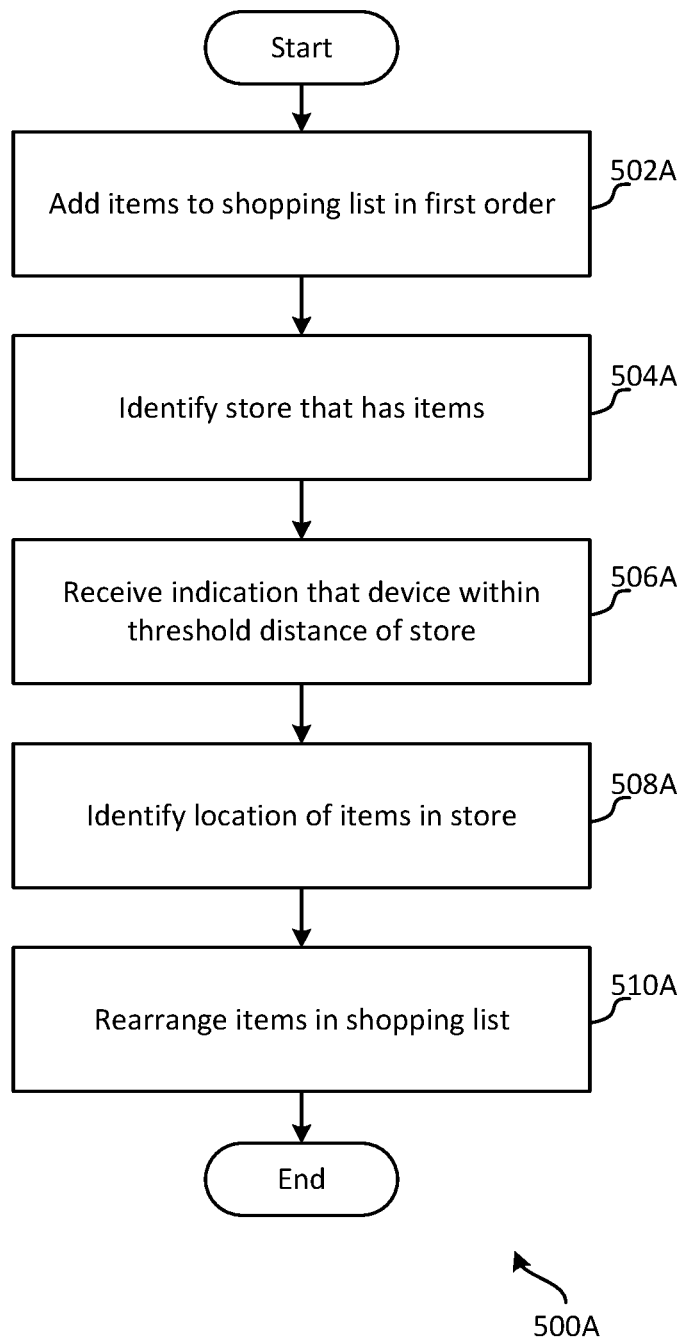
FIG. 5A is an exemplary method for assisting with task completion.

FIG. 5A is an exemplary method 500A for assisting with task completion. The method 500A begins at a start operation and flow continues to operation 502A.

At operation 502A a plurality of items is added to an electronic shopping list associated with a task completion application. The plurality of items that is added to the electronic shopping list is arranged in a first order in the electronic shopping list. The plurality of items may be added via various mechanisms. In some examples, the plurality of items may be identified from a natural language input in a message input to the task completion application and/or an application that the task completion application has been granted access to. In examples, the natural language input may be processed by one or more natural language processing models and/or machine learning models, and a determination may be made as to what the primary task associated with the message is (e.g., grocery shopping, event shopping, etc.), and what subtasks are included in the message (e.g., what items need to be purchased). In other examples, the items may be manually added to a shopping list individually in one contemporaneous session or over several input sessions. In examples, the shopping list may be initially arranged (in the first order) according to a time that they were added to the shopping list or according to alphabetical order.

From operation 502A flow continues to operation 504A where a store that each of the plurality of items is available for purchase at is identified. In some examples, one or more rules associated with the task completion application may dictate which stores' inventory/item availability should be analyzed to determine whether the items are available for purchase. Examples of the rules that may dictate this analysis include: only analyze the inventory/item availability for stores that are within a threshold proximity of a computing device on which the task completion application with the shopping list is executed on; analyze the inventory/item availability for stores in an outward radius from the device on which the task completion application with the shopping list is executed on until a specified number (one, two, three, etc.) of stores having the items for purchase is identified; determine whether a coupon, gift card, and/or rewards account can be identified on one or more applications of the computing device on which the task completion application with the shopping list is executed on, and analyze stores corresponding to those elements first.

According to examples, the availability of the items at one or more stores may be identified based on analysis of a store database associated with the task completion application and/or service. For example, a task completion service may maintain a database that stores can upload item availability to and/or item location information in a store to. In other examples, the stores may maintain separate availability and/or locational databases and provide the task completion application and/or service with access to that information (e.g., via an API call).

From operation 504A flow continues to operation 506A where an indication that a computing device associated with the electronic shopping list is within a threshold distance of an entrance of the store is received. In some examples, the entrances of the store may be mapped by a mapping application and/or service (e.g., Bing Maps) and the computing device's GPS coordinates may be compared against one or more entrances of the store to determine whether the device is within the threshold distance. In other examples, the determination may be made based on the location of the computing device being determined via cell tower triangulation. In still other examples, the determination may be made based on the location of the computing device being determined via its connection to a Wi-Fi hub in proximity to the store.

From operation 506A flow continues to operation 508A where a location of each of the plurality of items in the store is identified. The location of each of the plurality of items in the store may be identified based on analysis of a store database as described above in relation to operation 504A. That is, a store database containing the availability of items and their respective locations in a store may be maintained by the task completion application. In other examples the availability of items and their respective locations in a store may be maintained by a database of the store itself and the task completion application and/or service may be granted with access to that information.

From operation 508A flow continues to operation 510A where the plurality of items is arranged in a second order in the electronic shopping list based on the location of each of the plurality of items in the store relative to the entrance of the store. For example, the items may be rearranged such that the closer an item is to the entrance of the store, the higher and/or more prominent the item is in the list. In other examples, the plurality of items may be arranged in a second order in the electronic shopping list based on the location of each of the plurality of items in the store relative to an identified location of the user's computing device. In some examples, the computing device's location may updated periodically while the user is shopping at the store, and the items may be rearranged dynamically based on that changing location.

From operation 510A flow continues to an end operation and the method 500A ends.

Figure 5B:
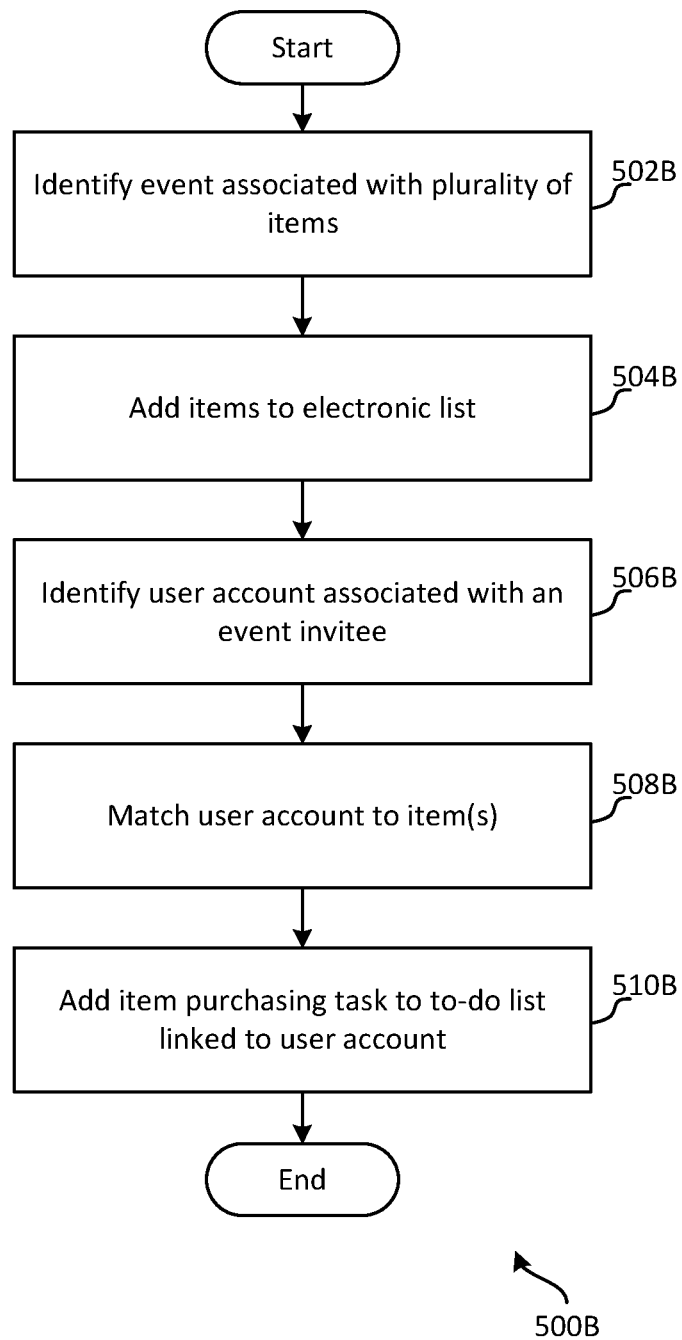
FIG. 5B is another exemplary method for assisting with task completion.

FIG. 5B is another exemplary method for assisting with task completion is association with a task completion application and/or service. The method 500B begins at a start operation and flow continues to operation 502B.

At operation 502B an event with a plurality of items associated with it is identified. In some examples the event itself may be added to the task completion application (e.g., "Plan Birthday", "Work Retreat", etc.). In other examples, the event may be identified via application of one or more natural language processing and/or machine learning models to a natural language input in an application that the task completion application has access to (e.g., an email, a text message, a direct message, etc.). Like the event itself, the plurality of items may be added to the event itself or they may be identified in an electronic message via application of the natural language processing and/or machine learning models.

From operation 502B flow continues to operation 504B where the plurality of items is added to an electronic list. The electronic list may be associated with the task completion application and/or service and it may be saved in association with the event creator and/or one or more invitees to the event.

From operation 504B flow continues to operation 506B where a user account associated with an invitee of the event is identified. In examples, the user account may be an account of the task completion application, an email account, an account with access to multiple productivity applications, etc. The user account may be identified by being included directly in the event and/or event invitation (e.g., if the event was identified in an email with the invitee being included in the "To" field, if the event itself was added directly to the task completion application and an account alias for the invitee was also included in that input). The user account may also be identified by matching a name of an invitee in an electronic message and matching that name to an account database.

From operation 506B flow continues to operation 508B where the user account is matched to one of the items based on at least one of: a computing device associated with the user account being within a threshold distance of a store that carries the item; a search history associated with the user account for items of the item type; and a history of assigning items of the item type to the user by one or more event organizers.

From operation 508B flow continues to operation 510B where the purchasing of the item is added to an electronic to-do list linked to the user account. The to-do list may be surfaced in the task completion application if the user has the application installed on the user's device. In other examples, a link to the to-do list may be sent to the user via an email or other electronic message and the user may access the to-do list remotely and/or download the to-do list.

From operation 510B flow moves to an end operation and the method 500B ends.

Figure 6:
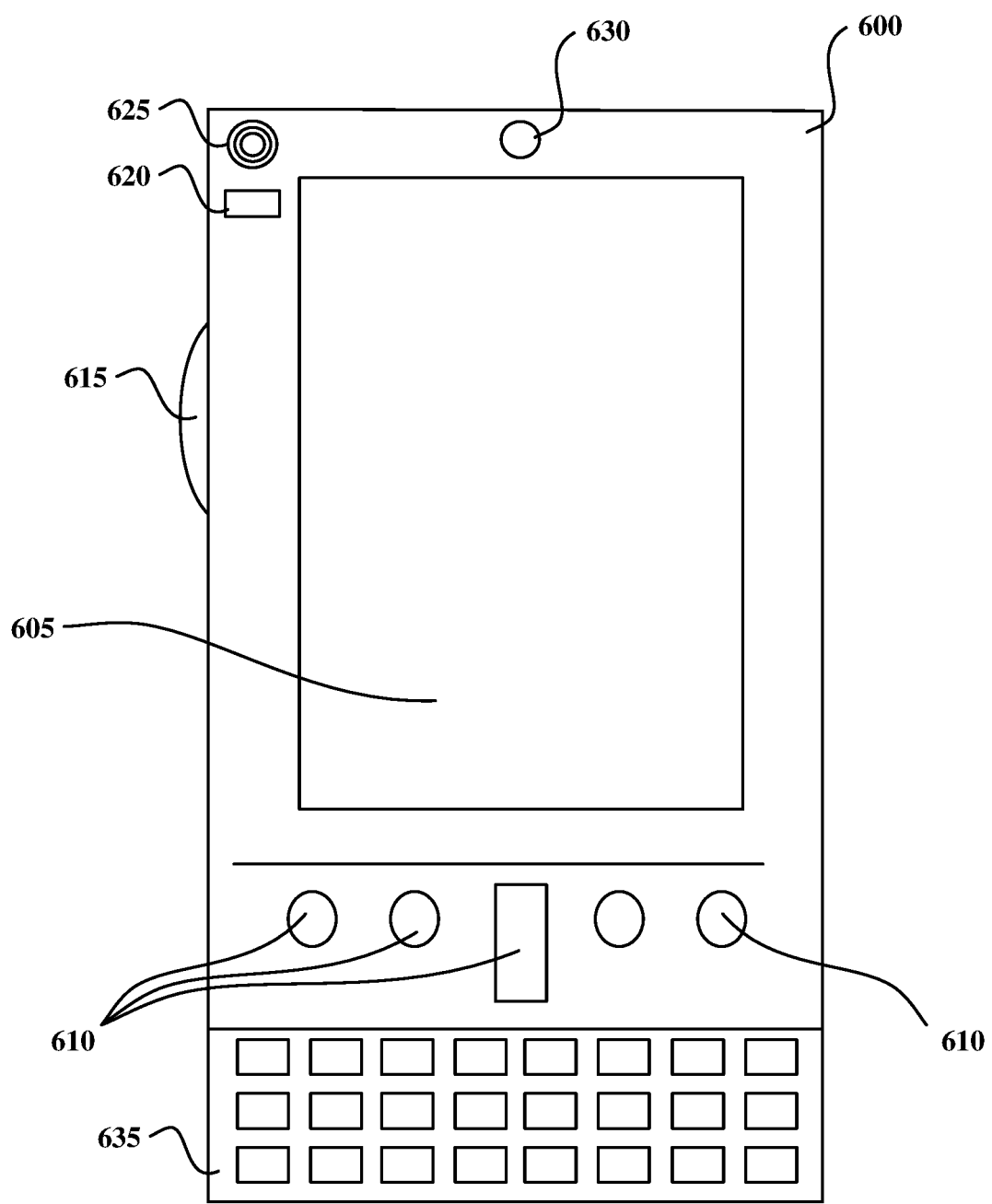
FIGS. 6 and 7 are simplified diagrams of a mobile computing device with which aspects of the disclosure may be practiced.
Figure 7:
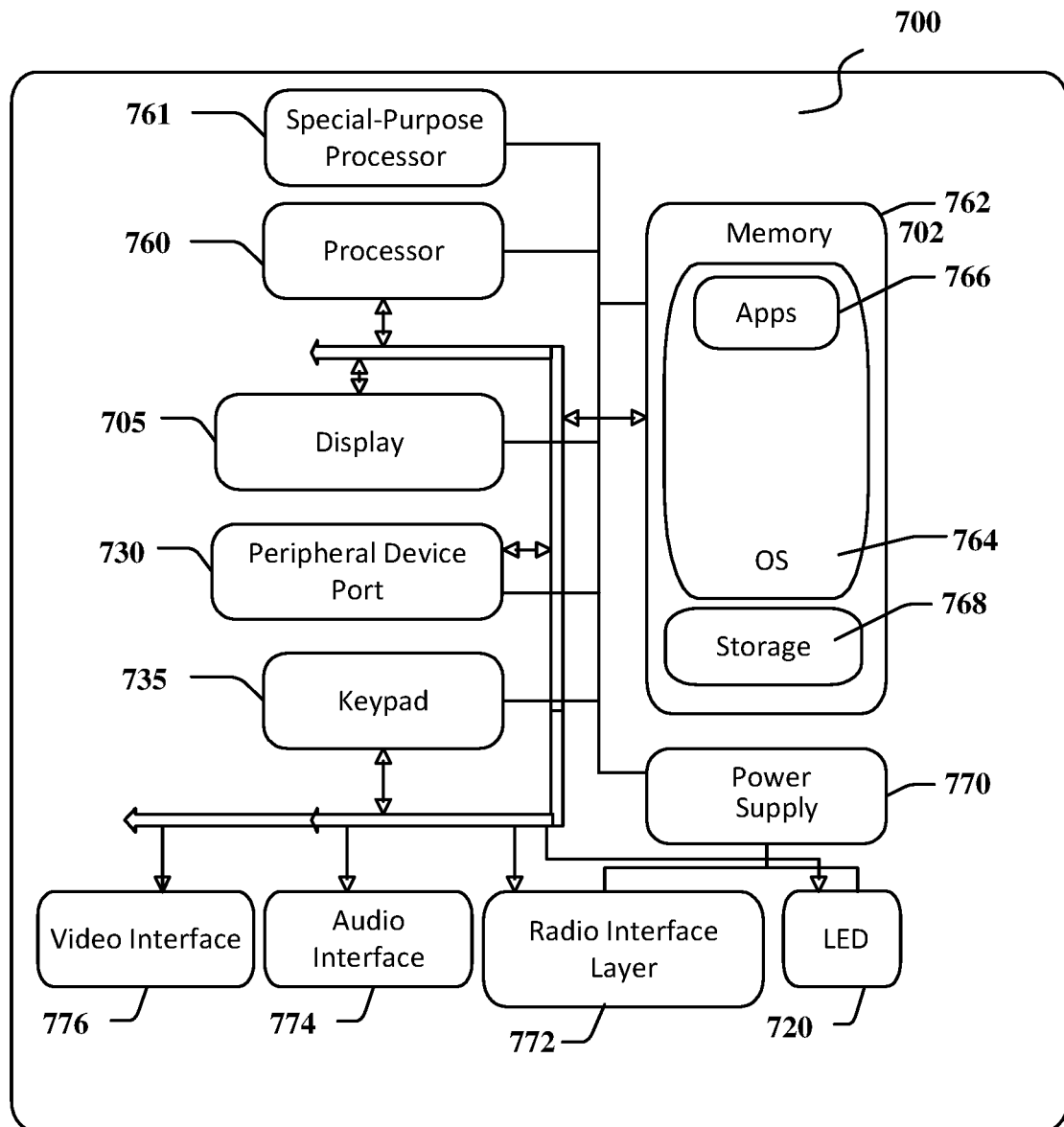

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft"

keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a to-do list application and/or a daily to-do list creation and/or augmentation service.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
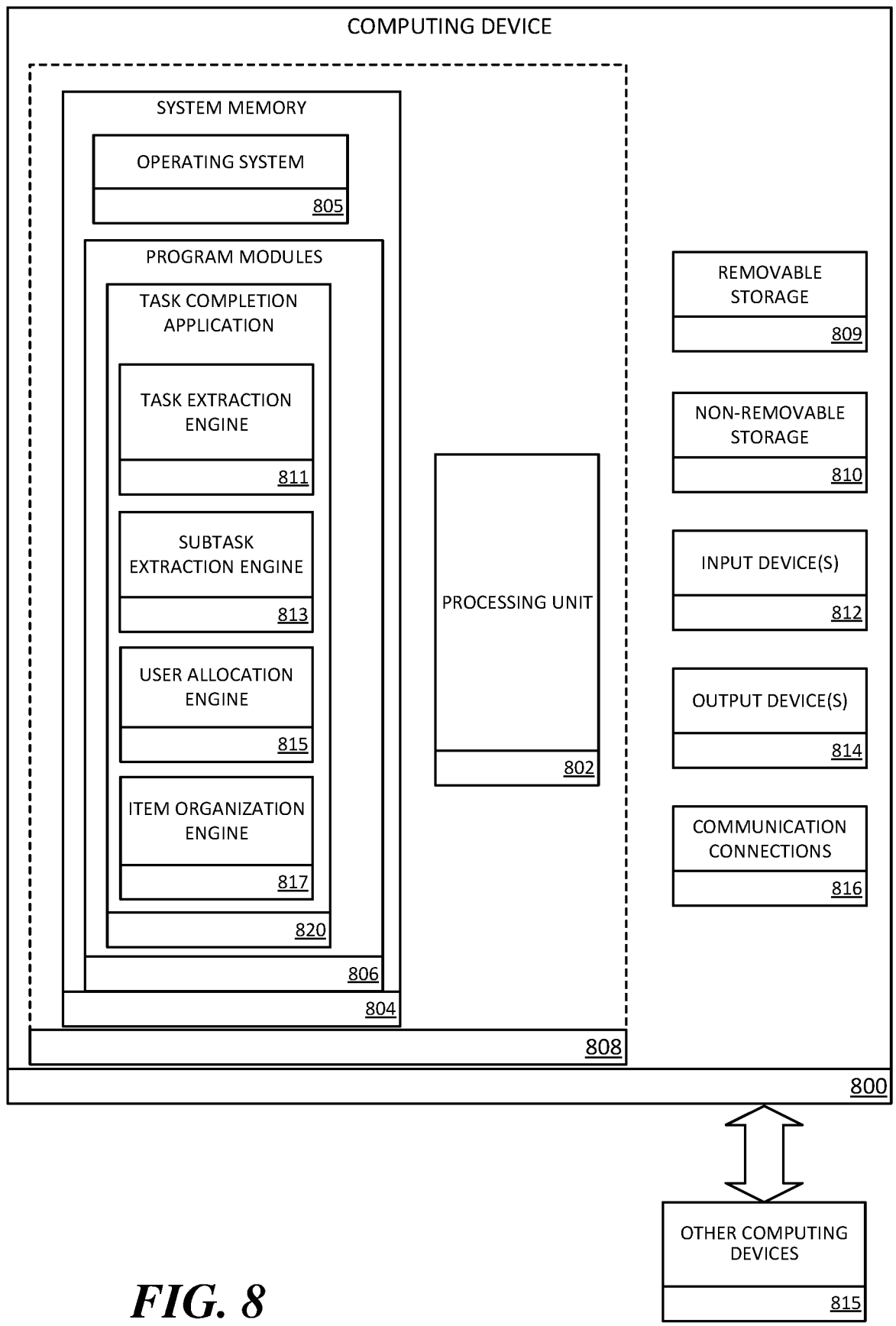
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for task completion and efficient completion of shopping to-do lists. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more to-do list programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., task completion application 820) may perform processes including, but not limited to, the aspects, as described herein. According to examples, task extraction engine 811 may perform one or more operations associated with applying one or more natural language processing and/or machine learning models to a message and/or an input to a task completion application and determining whether an event is present and/or whether tasks and/or subtasks are present in the message/input. Subtask extraction engine 813 may perform one or more operations associated with identifying subtasks included in messages and adding them to a task list and/or shopping list of a task list. User allocation engine 815 may perform one or more operations associated with assigning tasks to users based on rules associated with the task completion application. Item organization engine 817 may perform one or more operations associated with organizing and reorganizing tasks in a task list based on a user's location (i.e., a user's computing device) in a store relative to items and/or one or more entrances of the store.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
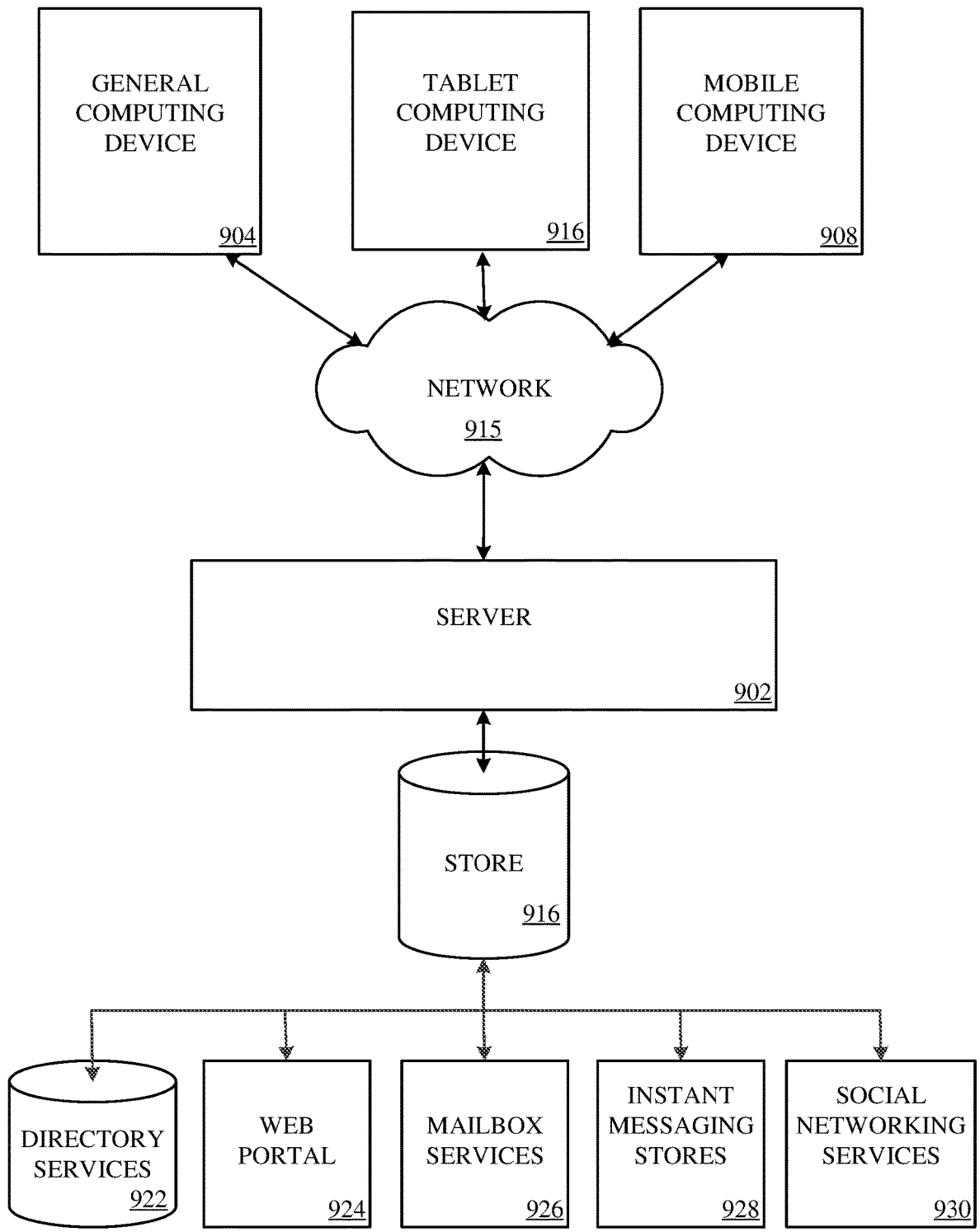
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for assisting with task completion, the computer-implemented method comprising:

receiving an electronic message comprising a natural language input;

processing the electronic message with a natural language processing model;

identifying, based on the processing of the electronic message with the natural language processing model, a shopping task and a plurality of items associated with that shopping task;

adding the plurality of items to an electronic shopping list;

sending, via a distributed computing network, a first API call to a first item and location database associated with a first store;

determining, based on the first API call, that a first subset of the plurality of items is available for purchase at the first store;

determining, based on the first API call, a location of each of the items in the first subset at the first store;

arranging, in a first order based on the determined location of each of the items in the first subset, the first subset of the plurality of items in the electronic shopping list beneath a displayed identity of the first store;

determining that a second subset of the plurality of items is not available for purchase at the first store;

sending, via the distributed computing network, a second API call to a second item and location database associated with a second store;

determining, based on the second API call, that the second subset of the plurality of items is available for purchase at the second store;

determining, based on the second API call, a location of each of the items in the second subset at the second store;

arranging, in a second order based on the determined location of each of the items in the second subset, the second subset of the plurality of items in the electronic shopping list beneath a displayed identity of the second store;

determining a location of a computing device associated with the electronic shopping list in the first store; and arranging the first subset of the plurality of items in a third order in the electronic shopping list based on the location of each of the items in the first subset relative to the determined location of the computing device.

2. The computer-implemented method of claim 1 further comprising:

surfacing the electronic shopping list on a display of the computing device in the third order;

receiving a selection of one of the second subset of the plurality of items; and surfacing, on the display, an indication of the location of the selected item in the store.

3. The computer-implemented method of claim 2, wherein the indication comprises at least one of: an aisle in the store; a shelf in the store; a quadrant of the store; and a level of the store.

4. The computer-implemented method of claim 1, further comprising:

determining that the user traveled to the first store in a car;

receiving an indication from another computing device that the user has reached a minimum threshold amount of an additional item;

determining that the additional item is available for purchase at the first store;

identifying the location of the additional item in the first store; and adding the additional item beneath the displayed identity of the first store in the electronic shopping list.

5. The computer-implemented method of claim 4, wherein the additional item is added at a position in the third order based on the location of the additional item in the store relative to the location of each of the plurality of items in the store.

6. A computer-readable storage device comprising executable instructions that, when executed by one or more processors, assists with task completion, the computer-readable storage device including instructions executable by the one or more processors for:

receiving an electronic message comprising a natural language input;

processing the electronic message with a natural language processing model;

identifying, based on the processing of the electronic message with the natural language processing model, a shopping task and a plurality of items associated with that shopping task;

adding the plurality of items to an electronic shopping list;

sending, via a distributed computing network, a first API call to a first item and location database associated with a first store;

determining, based on the first API call, that a first subset of the plurality of items is available for purchase at the first store;

determining, based on the first API call, a location of each of the items in the first subset at the first store;

arranging, in a first order based on the determined location of each of the items in the first subset, the first subset of the plurality of items in the electronic shopping list beneath a displayed identity of the first store;

determining that a second subset of the plurality of items is not available for purchase at the first store;

sending, via the distributed computing network, a second API call to a second item and location database associated with the second store;

determining, based on the second API call, that the second subset of the plurality of items is available for purchase at the second store;

determining, based on the second API call, a location of each of the items in the second subset at the second store;

arranging, in a second order based on the determined location of each of the items in the second subset, the second subset of the plurality of items in the electronic shopping list beneath a displayed identity of the second store;

determining a location of a computing device associated with the electronic shopping list in the first store; and arranging the first subset of the plurality of items in a third order in the electronic shopping list based on the location of each of the items in the first subset relative to the determined location of the computing device.

7. The computer-readable storage device of claim 6 further comprising:

surfacing the electronic shopping list on a display of the computing device in the third order;

receiving a selection of one of the second subset of the plurality of items; and surfacing, on the display, an indication of the location of the selected item in the store.

8. The computer-readable storage device of claim 7, wherein the indication comprises at least one of: an aisle in the store; a shelf in the store; a quadrant of the store; and a level of the store.

9. The computer-readable storage device of claim 6, wherein the instructions are further executable by the one or more processors for:

determining that the user traveled to the first store in a car;

receiving an indication from another computing device that the user has reached a minimum threshold amount of an additional item;

determining that the additional item is available for purchase at the first store;

identifying the location of the additional item in the first store; and adding the additional item beneath the displayed identity of the first store in the electronic shopping list.

10. A system for assisting with task completion, comprising:

a memory for storing executable program code; and one or more processors, functionally coupled to the memory, the one or more processors being responsive to computer-executable instructions contained in the program code and operative to:

receive an electronic message comprising a natural language input;

process the electronic message with a natural language processing model;

identify, based on the processing of the electronic message with the natural language processing model, a shopping task and a plurality of items associated with that shopping task;

add the plurality of items to an electronic shopping list;

send, via a distributed computing network, a first API call to a first item and location database associated with a first store;

determine, based on the first API call, that a first subset of the plurality of items is available for purchase at the first store;

determine, based on the first API call, a location of each of the items in the first subset at the first store;

arrange, in a first order based on the determined location of each of the items in the first subset, the first subset of the plurality of items in the electronic shopping list beneath a displayed identity of the first store;

determine that a second subset of the plurality of items is not available for purchase at the first store;

send, via the distributed computing network, a second API call to a second item and location database associated with a second store;

determine, based on the second API call, that the second subset of the plurality of items is available for purchase at the second store;

determine, based on the second API call, a location of each of the items in the second subset at the second store;

arrange, in a second order based on the determined location of each of the items in the second subset, the second subset of the plurality of items in the electronic shopping list beneath a displayed identity of the second store;

determine a location of a computing device associated with the electronic shopping list in the first store; and arrange the first subset of the plurality of items in a third order in the electronic shopping list based on the location of each of the items in the first subset relative to the determined location of the computing device.

11. The system of claim 10, wherein the one or more processors are further responsive to the computer-executable instructions and operative to:

surface the electronic shopping list on a display of the computing device in the third order;

receive a selection of one of the second subset of the plurality of items; and surface, on the display, an indication of the location of the selected item in the store.

12. The system of claim 11, wherein the indication comprises at least one of: an aisle in the store; a shelf in the store; a quadrant of the store; and a level of the store.

13. The system of claim 10, wherein the one or more processors are further responsive to the computer-executable instructions and operative to:

determine that the user traveled to the first store in a car;

receive an indication from another computing device that the user has reached a minimum threshold amount of an additional item;

determine that the additional item is available for purchase at the first store;

identify the location of the additional item in the first store; and add the additional item beneath the displayed identity of the first store in the electronic shopping list.

14. The system of claim 13, wherein the additional item is added at a position in the third order based on the location of the additional item in the store relative to the location of each of the plurality of items in the store.

* * * * *